(12) United States Patent
Baldwin et al.

(10) Patent No.: US 9,100,467 B2
(45) Date of Patent: Aug. 4, 2015

(54) ALTERNATE ROUTING OF VOICE CALLS IN A HEAVILY LOADED SIP NETWORK

(75) Inventors: Christopher D. Baldwin, Princeton, NJ (US); Miloš Pujić, Belleville (CA); Kurt H. Haserodt, Westminster, CO (US); Benny Rodrig, Lexington, MA (US); Dan Gluskin, Tel Aviv (IL); Harsh V. Mendiratta, East Brunswick, NJ (US); Amerjit Sandhu, Montvale, NJ (US); Mark Rolfs, Denver, CO (US); James Douglas Free, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 205 days.

(21) Appl. No.: 13/419,262

(22) Filed: Mar. 13, 2012

(65) Prior Publication Data

US 2013/0163433 A1 Jun. 27, 2013

Related U.S. Application Data

(60) Provisional application No. 61/580,554, filed on Dec. 27, 2011.

(51) Int. Cl.
*H04M 7/00* (2006.01)
*H04L 29/06* (2006.01)
*H04M 7/12* (2006.01)

(52) U.S. Cl.
CPC ........... *H04M 7/0081* (2013.01); *H04L 65/103* (2013.01); *H04L 65/1006* (2013.01); *H04L 65/1069* (2013.01); *H04M 7/12* (2013.01)

(58) Field of Classification Search
CPC ... H04M 7/0057; H04M 7/0081; H04M 7/12; H04L 65/1006; H04L 65/1056
USPC .................................. 370/236, 217–218, 221
See application file for complete search history.

(56) References Cited

U.S. PATENT DOCUMENTS

| | | | |
|---|---|---|---|
| 6,882,653 B1 | 4/2005 | Kiuchi et al. | |
| 7,215,643 B2 | 5/2007 | Mussman et al. | |
| 7,457,249 B2 | 11/2008 | Baldwin et al. | |
| 7,564,793 B2 | 7/2009 | Baldwin et al. | |
| 7,613,106 B2 | 11/2009 | Baldwin et al. | |
| 7,720,084 B2 * | 5/2010 | Mussman et al. | 370/401 |
| 2010/0215033 A1 * | 8/2010 | Shaw et al. | 370/352 |
| 2011/0273979 A1 * | 11/2011 | Grabelsky et al. | 370/225 |

OTHER PUBLICATIONS

Maximo et al., "Call Admission Control in Lync Server 2010", available at http://technet.microsoft.com/en-us/library/ff731056.aspx, Microsoft, Jun. 2010, 7 pages.

\* cited by examiner

*Primary Examiner* — Un C Cho
*Assistant Examiner* — Fangyan Deng
(74) *Attorney, Agent, or Firm* — Sheridan Ross P.C.

(57) ABSTRACT

Methods and systems for supporting the alternate routing of calls between endpoints, such as session initiation protocol (SIP) endpoints, are provided. An inner gateway alternate route (IGAR) application is invoked when the primary, Internet protocol, communication network is overloaded or otherwise unable to handle a call. The IGAR application assigns incoming and outgoing trunks, and serves as a contact point for session managers in routing the trunk call.

15 Claims, 3 Drawing Sheets

ALTERNATE ROUTING OF VOICE CALLS IN A HEAVILY LOADED SIP NETWORK

CROSS-REFERENCE TO RELATED APPLICATIONS

This application claims the benefit of U.S. Provisional Patent Application Ser. No. 61/580,554, filed Dec. 27, 2011, the entire disclosure of which is hereby incorporated herein by reference.

FIELD

The invention relates to the alternate routing of calls in a SIP network.

BACKGROUND

IP networks generally provide an excellent infrastructure for geographically distributing components of a telecommunication system. The underlying IP network is optimal for transmission for control signaling, and when bandwidth is available, can provide an acceptable quality of service (or QoS) or grade of service (or GoS) for voice communications. When insufficient network resources are available for voice communications or one or more IP network components are down, voice communications can be adversely impacted.

A number of techniques have been attempted to address these issues.

In one technique, if a system had multiple communication gateways controlled by a single controller and the private switching facilities inter-connecting these gateways failed, users can "dial-out" on a public network trunk using the public address (or Direct Inward Dialing or DID number) of the destination party. This approach requires manual intervention by the user first to recognize that a problem exists, second to determine how to circumvent it, and third to dial the DID number. Normally, the calling party would dial only an extension to reach the destination party. If the destination party to be reached does not have a public number, he or she is not reachable by the alternate network.

In another technique known as PSTN Fallback™ of Avaya Inc., a call is forced to the PSTN when an IP trunk connection experiences an unacceptable QoS or GOS. In particular, in a multi-enterprise architecture, each enterprise may have a separate, independent, and active or primary media servers with resident call controller functionality, a plurality of digital stations, a plurality of IP or Internet Protocol stations, a gateway and a Local Area Network or LAN. The media servers are independent in that one media server in one enterprise is generally unaware of the subscriber configuration information, such as extensions, of the other enterprise's subscribers. The gateways are interconnected by the Public Switched Telephone Network or PSTN and Wide Area Network or WAN. When a call is to be placed over the WAN, the originating call controller determines the currently measured network delay and packet loss. When either measured variable reaches a predetermined threshold, the call controller automatically takes the idle IP trunk ports out-of-service, i.e., it busies out the ports. The ports remain out-of-service until the measurements return to the low threshold. No new calls are allowed over the IP trunk. Normal or conventional call routing over the PSTN is used for access to the next preference in the route pattern.

In another technique known as Separation of Bearer and Signaling™ (SBS) of Avaya Inc., the signaling channel for a call is routed over the WAN while the bearer channel is routed over the PSTN. The signaling channel in SBS includes SBS call-control signaling and QSIG private-networking protocol information. SBS associates the signaling and bearer channels at the SBS originating and terminating nodes so that they appear to the end users to be a normal, non-separated call. The use of the WAN for signaling traffic and the PSTN for voice bearer traffic addresses a customer need for using small amounts of bandwidth in the IP WAN for signaling traffic, with the voice bearer portion of the call being sent over inexpensive PSTN facilities.

PSTN Fallback™ and SBS™ address architectures where there exist multiple, separate system implementations interconnected by a traditional inter-switch trunking protocol; in other words, they permit inter-connection only of peer-to-peer systems. With the move to larger, single-server IP WAN-connected media gateway distributed systems, there is no longer a need for IP trunks and SBS. Using trunk group administration to limit bandwidth between media servers is not required nor is PSTN Fallback™ when the number of calls exceeds the administered IP trunk member limit. There is no need to embed an intelligent signaling interface between servers over IP WAN facilities given that the system has only a single active or primary server and that all calls across the system appear to be station-to-station calls.

Another technique for managing IP bandwidth usage includes call admission control in which the number of calls across the WAN or the bandwidth available for voice calls is limited. Call admission control can result in the call being denied and being forwarded to the callee's voice mail server (if accessible), thereby causing caller frustration.

In other systems, a communication manager providing a call admission control function can perform alternate routing, but not over the PSTN. In still other systems, alternate routing can be performed over the PSTN, but not on behalf of session initiation protocol (SIP) endpoints because such endpoints are not controlled by such communication servers. In these systems, the communication server merely functions as a feature server for the SIP endpoints.

These systems typically effect alternate routing over the PSTN using dual tone multiple frequency (DTMF) signaling techniques. However, such techniques are slow.

Accordingly, there is a need for systems and methods that provide for routing a call between SIP endpoints when the primary wide area network (WAN) is too busy to provide satisfactory quality of service and/or bandwidth.

SUMMARY

These and other needs are addressed by the various embodiments and configurations of the present disclosure. In accordance with embodiments of the present disclosure, methods and systems are provided that enable the establishment of alternate routes for calls placed between endpoints, including but not limited to session initiation protocol (SIP) endpoints. More particularly, embodiments of the present disclosure allow for the routing of calls between endpoints using the public switched telephony network (PSTN). Moreover, at least some embodiments allow for calls to be completed in a reverse direction. The present disclosure provides a solution that does not require tight control of the gateway by a communications server. For example, the creation of required state information on the gateways can be accomplished using standard SIP signaling.

Embodiments of the present disclosure provide a communications core that controls and/or provides certain network communication features. More particularly, the communications core can comprise a server that implements one or more session managers or modules. In addition, the communications core can execute or provide an inter-gateway alternate route (IGAR) function or application. The session manager module or modules and the IGAR application can be executed by a communications core comprising a single server. In accordance with alternate embodiments, various components can be distributed among different server devices. The communications core is generally interconnected to a plurality of enterprise systems or network regions by a communication network. The communication network can comprise an Internet protocol network. The enterprise regions generally include a plurality of endpoints, such as SIP endpoints, and are associated with at least one terminal gateway. The different enterprise regions can be interconnected to one another by an alternate network, such as the PSTN, in addition to the IP communication network.

Methods in accordance with embodiments of the present disclosure include invoking an IGAR application by a session manager module in response to a request to initiate a call, where the primary IP communication network is intact but overloaded and therefore unable to handle an additional call. The IGAR application, in response to receiving a message from the session manager requesting initiation of a call, selects outgoing and incoming terminal gateways for the call, based on where they are relative to the call endpoints. The selection of the terminal gateways can also be made with reference to a cost index assigned to or otherwise associated with the terminal gateways. The IGAR application initiates the trunk call over the alternate network, such as the PSTN, using a unique identifier, such as a caller ID, that is assigned to a user in the calling branch, and using as the destination of the trunk call a unique direct inward dial (DID) number assigned to the destination branch. The unique identifier and/or the unique DID number are not required to be dedicated numbers. For example, the IGAR application can select any DID from the called and/or calling branch. In addition, the two legs or trunk calls can be matched based on caller ID. Moreover, this solution is faster and potentially cheaper than previous solutions that utilized DTMF signaling to match different legs of a call. The connectivity information for the outgoing trunk is sent to the initiating or calling SIP endpoint, and ringback is provided to the user of the calling SIP endpoint. When the trunk call arrives at the terminal gateway in the other branch, that terminal gateway notifies the session manager about the incoming trunk call. The session manager receiving that notification in turn notifies the IGAR application. Using the incoming identifier, the IGAR application matches the outgoing trunk to the incoming trunk. The IGAR application rings the called SIP endpoint and sends that endpoint the connectivity information needed to connect to the incoming call when the user of the called SIP endpoint answers. When the user of the called SIP endpoint answers, the user of the calling SIP endpoint is already connected to the trunk, and can hear the greeting from the user of the called SIP endpoint.

Where a reverse direction for establishing the call is specified, for example where initiating the call from the destination branch is indicated because doing so would be lower cost, the IGAR application directs the calling SIP endpoint to play local ringback. When the trunk call arrives at the terminal gateway in the calling branch, the IGAR application receives notification from the session manager and uses the incoming identifier to match the outgoing trunk to the incoming trunk. The IGAR application then sends the calling endpoint the connectivity information needed to connect to the outgoing trunk when the user of the called SIP endpoint answers. When the called SIP endpoint is answered, the IGAR application sends the connectivity information for the incoming trunk to the called SIP endpoint, and the calling user can hear the greeting from the user of the called SIP endpoint.

Additional features and advantages of embodiments of the present disclosure will become more readily apparent from the following description, particularly when taken together with the accompanying drawings.

DETAILED DESCRIPTION

Figure 1:
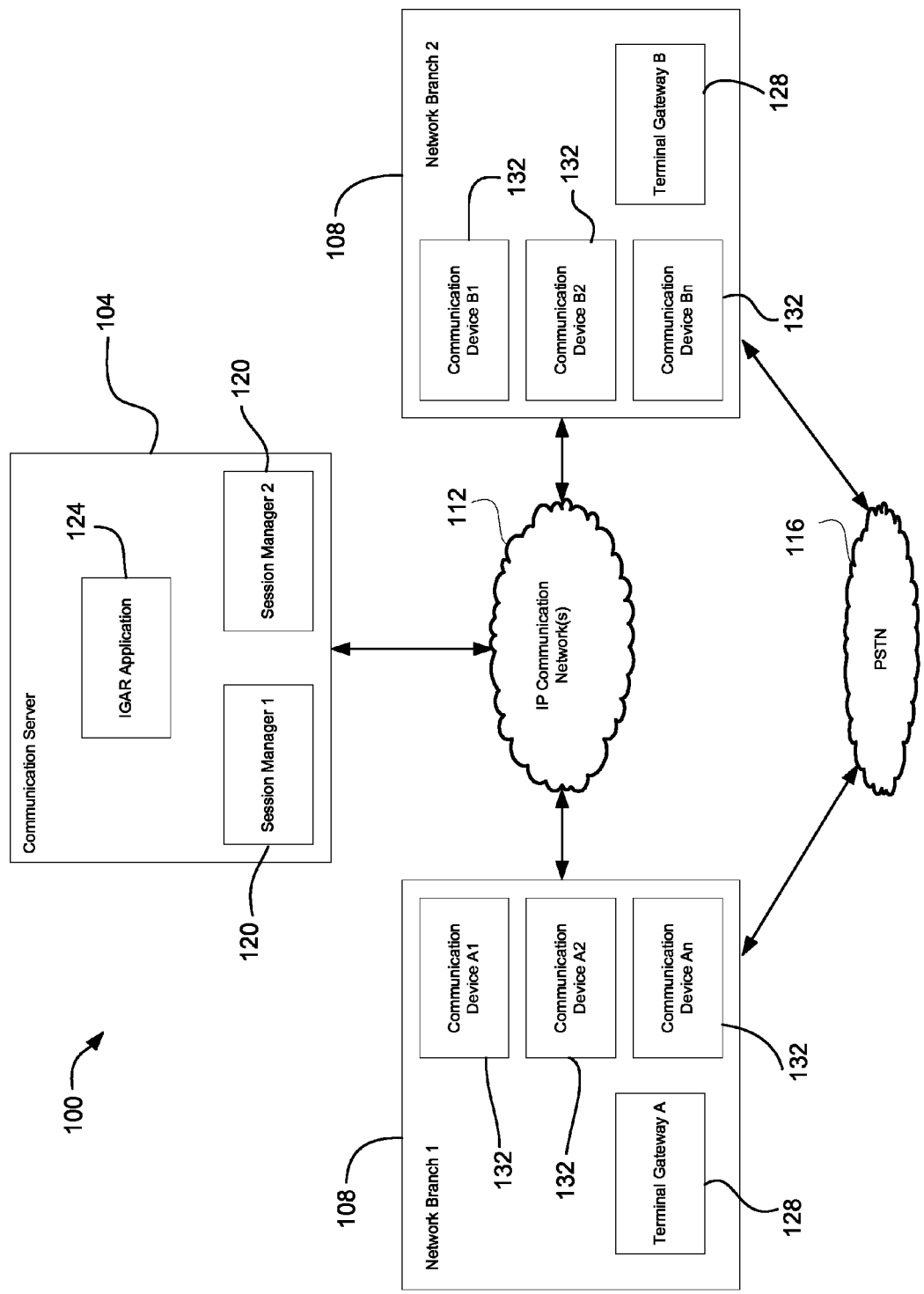
FIG. 1 illustrates components of a communication network in accordance with embodiments of the present disclosure.

FIG. 1 illustrates an exemplary communication system 100. The system 100 includes a communication server 104 and a plurality of network branches or regions 108. The communication server 104 and the different network branches are interconnected to one another by an Internet protocol (IP) communication network 112. As can be appreciated by one of skill in the art after consideration of the present disclosure, the IP communication network 112 can comprise a plurality of networks. As examples, the IP communication network 112 can comprise the public Internet, a corporate wide area network (WAN), and/or a local area network (LAN). Moreover, the branches 108 of the communication system 100 can comprise different enterprise regions or federated enterprises. In addition to the IP communication network 112, the network branches 108 are interconnected by the public switched telephony network (PSTN) 116.

The communication server 104 generally includes one or more session manager applications or modules 120. In general, a session manager application 120 can operate to control aspects of the operation of endpoints 132, including but not limited to session initiation protocol endpoints, associated with a network branch 108, and to provide various communication features to such endpoints. In addition, the communication server 104 can include an inter-gateway alternate routing (IGAR) application or module 124. As described in greater detail elsewhere herein, the IGAR application 124 operates in cooperation with the one or more session managers 120 to provide alternate routing functionality over the PSTN 116. In addition, although shown as being located on a common communication server 104, the various modules, such as the session managers 120 and IGAR application 124 are typically distributed among different communication server 104 devices that are or can be in communication with one another.

Each network region or branch 108 can include a terminal gateway 128 that operates to interconnect the associated branch 108 to the IP communication network 112 and/or the PSTN 116. In accordance with alternate embodiments, a network branch 108 can be associated with multiple trunk or terminal gateways 128. For example, a first terminal gateway 128 of a branch 108 can provide a connection to the IP communication network 112, while a second terminal gateway 128 of the region or branch 108 can provide connectivity to the PSTN 116. In addition, each network branch 108 can include a plurality of endpoints or devices 132, such as session initiation protocol (SIP) communication endpoints or devices.

Figure 2:
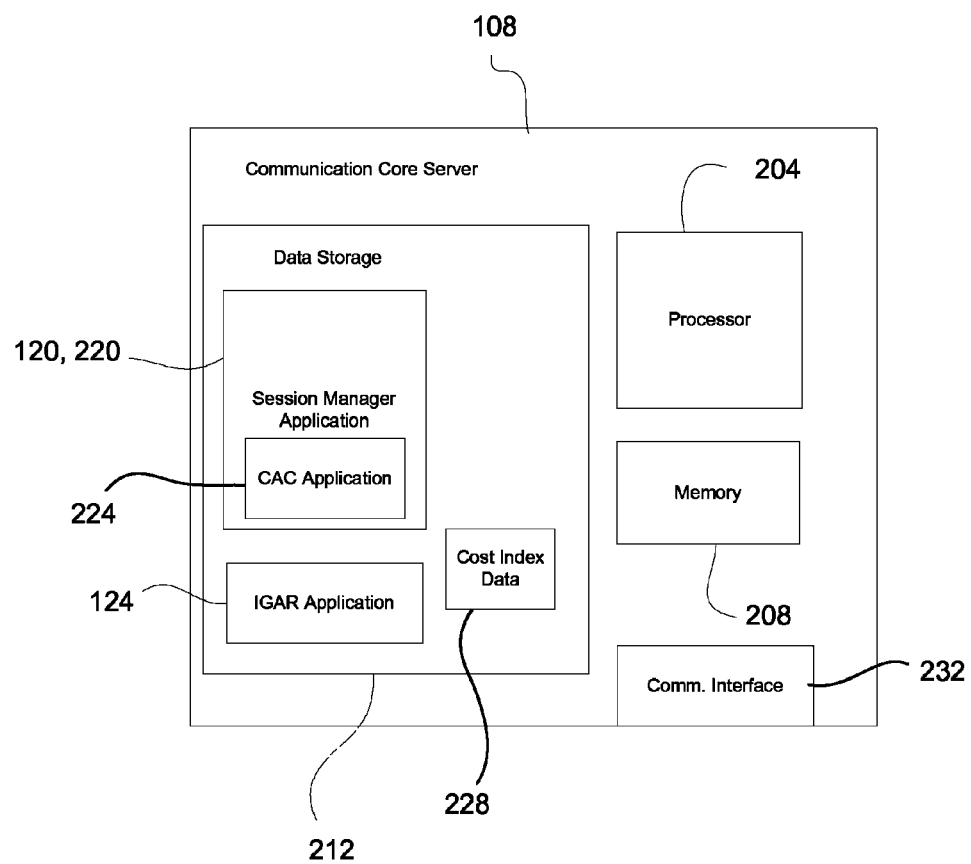
FIG. 2 illustrates components of an exemplary communication core server in accordance with embodiments of the present disclosure.

FIG. 2 illustrates components of an exemplary communication server 104. In general, a communication server 104 can comprise a general purpose computer or server device that provides various communication functions and features. Accordingly, the communication server 104 can include a processor 204. The processor 204 may comprise a general purpose programmable processor or controller for executing application programming or instructions. As a further example, the processor 204 may comprise a specially configured application specific integrated circuit (ASIC) or other integrated circuit, a digital signal processor, a hard wired electronic or logic circuit such as a discrete element circuit, a programmable logic device or gate array, special purpose computer, or the like. The processor 204 generally functions to run programming code or instructions implementing various functions of the communication server.

A communication server 104 may also include memory 208 for use in connection with the execution of application programming by the processor 204, and for the temporary or long term storage of program instructions and/or data. As examples, the memory 208 may comprise RAM, SDRAM or other solid state memory. Alternatively or in addition, data storage 212 may be provided. In accordance with embodiments of the present disclosure, data storage 212 can contain programming code or instructions implementing various of the applications or functions executed or performed by the communication server 104. Like the memory 208, the data storage 212 may comprise a solid state memory device or devices. Alternatively or in addition, the data storage 212 may comprise a hard disk drive or other random access memory.

In accordance with embodiments of the present disclosure, the data storage 212 can include various applications and data. For example, the data storage 212 can include a session manager application 220, the execution of which by the processor 204 implements functions of a session manager module 120. In general, the session manager application 220 provides connectivity and features with respect to endpoints 132 associated with federated or other network branches 108. The session manager application 220 can implement or provide a call admission control (CAC) application 224. As a further example, the data storage 212 can include an IGAR application 124. As described in greater detail elsewhere herein, execution of the IGAR application 124 by the processor 204 enables communications between endpoints 132 in different network regions 108 to be completed over the PSTN 116, where the primary IP communication network 112 is intact but unavailable to handle an additional call, such as where the primary IP communication network 112 is determined to be busy. The data storage 212 can also include cost index data 228. The communication server 104 can additionally include a communication interface or interfaces 232. The communication interface 232 may provide connectivity between the communication server 104 and other components of the network system 100, including components of the different network branches 108, via the IP communication network or networks 112.

Figure 3:
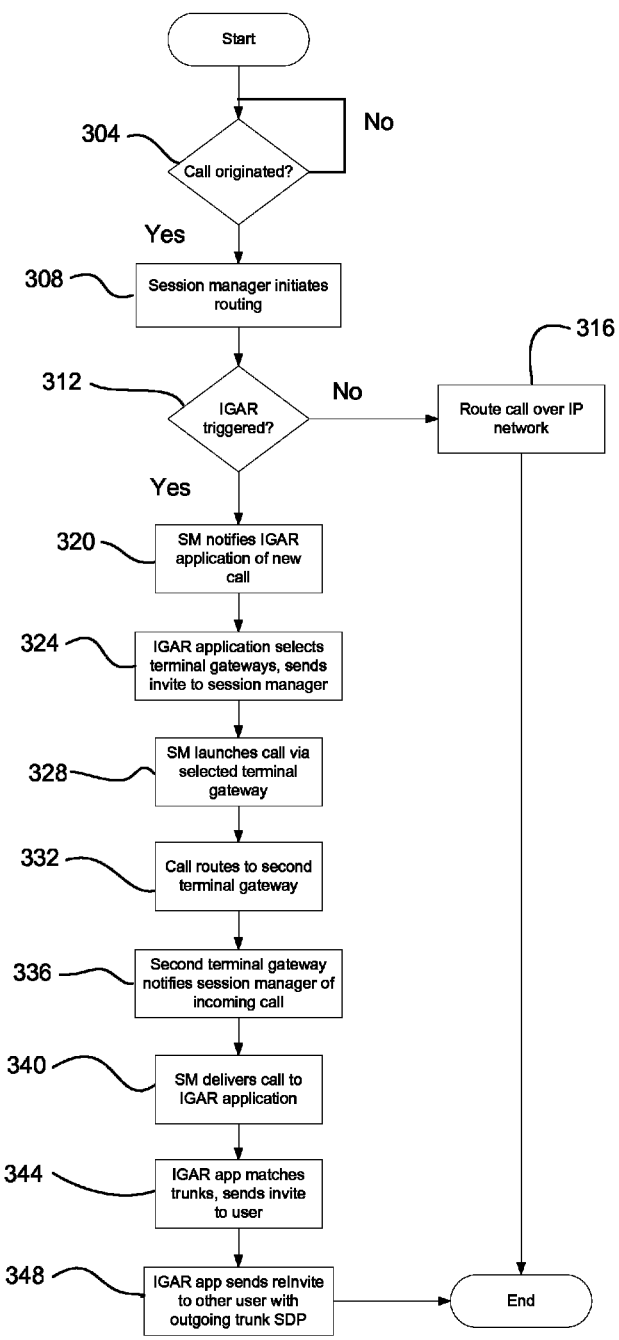
FIG. 3 illustrates aspects of a method for providing alternate call routing in a communication system in accordance with embodiments of the present disclosure.

With reference now to FIG. 3, aspects of the operation of a communication system 100 in accordance with embodiments of the present disclosure are illustrated. Initially, at step 304, a determination is made as to whether a call has been initiated or originated. Until a call has been initiated, the process may idle at step 304. After a call has been initiated, the session manager 120 responsible for the network region 108 from which the call originated begins routing the call (step 308). The routing of the call can include determining by the CAC application 224 for or associated with the session manager application 120 whether the call can be completed normally, over the IP communication network or networks 112. If the CAC application 224 indicates that call limits have been exceeded or that alternate routing is otherwise needed, the IGAR application 124 is triggered.

At step 312, a determination is made as to whether the IGAR application 124 has been triggered. If the IGAR application 224 has not been triggered, the call is routed over the IP network or networks 112 normally (step 316), and the process can end. Alternatively, if the IGAR application 124 has been triggered, the session manager 120 notifies the IGAR application 124 of the new call (step 320). The IGAR application 124 then selects or assigns terminal gateways 128, and sends an invite message to the session manager 120 handling the initiation of the trunk call (step 324). When the alternate call is initiated in the "forward" direction, the invite message includes the unique identifier of or assigned to the calling party and a unique DID number assigned to the destination branch. When the alternate call is initiated in the reverse direction, the invite message includes the unique identifier of or assigned to the called party and a unique DID number assigned to the calling branch 108. In either call, the phase of the invite can identify the IGAR application 124 (e.g., phase=igar). The selection of terminal gateways can include determining where the trunks are relative to the endpoints 132 involved in the call. The trunks can be traditional time division multiplexing (TDM) trunks or may represent connections over other alternate networks. At step 328, the session manager 120 launches the call via the selected, first terminal gateway 128. More particularly, the IGAR application 124 can initiate the trunk call by sending an invite message to the session manager 120 associated with the terminal gateway 128 that has been selected by the IGAR application 124 to launch the trunk call. That is, the trunk call can be originated from the session manager 120 and the terminal gateway 128 of either the calling or the called branch 108. The selection of a branch 108 from which to launch the trunk call can be made by selecting the lower cost branch 108 for originating the trunk call, for example by referencing a cost index (cost index data 228) stored on or available to the communication server 104. When the selected session manager initiates the trunk call it uses a unique caller identifier (ID) assigned by the IGAR application 124.

At step 332, the call routes across the PSTN 116 to the second terminal gateway 128. More particularly, the session manager 120 removes the phase tag from the invite message, which identifies the communication endpoint 132 and the listed directory number (LDN) of the IGAR application 124, and launches the call via the first terminal gateway 128 to the second terminal gateway 128. The second terminal gateway 128 notifies the session manager 120 of the incoming call (step 336). The session manager 120 associated with the second terminal gateway 128 recognizes the LDN of the IGAR application 124, and delivers the call to the IGAR application 124 (step 344). The IGAR application 124 uses the incoming identifier or caller ID to match the outgoing trunk to the incoming trunk (identified by the unique DID number), and sends an invite message to the called endpoint 132 with the connectivity information needed by the called endpoint 132 to connect that endpoint to the incoming trunk at the second terminal gateway 128 (step 348). This connectivity information can include the incoming trunk session description protocol (SDP) information. The user associated with the called endpoint 132 can then pick up and be placed in communication with the user associated with the calling endpoint 132 over the alternate route. Accordingly, information required to match the incoming and outgoing trunks is communicated as part of the signaling used in establishing the alternate call routing. This can result in decreased delay time as compared to previous systems that relied on in band DTMF signaling transmitted after the alternate route has been established. In addition, embodiments of the present disclosure allow alternate call routing to be performed using SIP endpoints, or non-SIP endpoints that are serviced by SIP-enabled intermediary nodes or devices. Calls can also be routed using any terminal gateway 128 within the enterprise network of the associated communication endpoint 132, including terminal gateways 128 in neighboring branches 108.

Embodiments of the present disclosure also provide support for launching alternate call routes in the "reverse" direction. In particular, the IGAR application 124 can cause an alternate call to be launched by the terminal gateway 128 at the called endpoint 132 end. Whether the terminal gateway 128 at the calling or called end launches the alternate call can be specified by a system administrator. Alternatively, a least expensive direction can be selected by the IGAR application 124 by referencing the cost index data 228.

In accordance with at least some embodiments of the present disclosure, in an example including SIP endpoints, the following steps are performed:
  a) SIP user A (endpoint A 132) calls SIP user B (endpoint B 132)
  b) Session Manager (SM) 120 uses Call Admission Control (CAC) 224 to determine that there is not enough bandwidth to complete the call. It does not ring SIP user B at this point.
  c) SM 120 initiates alternate routing by sending a message to an integrated IGAR application 124.
  d) The IGAR application 124 selects the outgoing and incoming terminal gateways (TGs) 128 for the call, based on where they are relative to the two endpoints 132, and a "cost index" assigned to each TG 128.
    a. These trunks may be traditional TDM trunks, or may represent connections over an alternate data network.
    b. The two TGs may be in the same branch as each of the parties, or may be in a neighboring branch.
  e) The IGAR application 124 initiates the trunk call, using a unique caller ID assigned to one of the users in the calling branch. The destination of the trunk call is a unique DID number assigned to the destination branch.
  f) The IGAR application 124 sends the connectivity information for the outgoing trunk to SIP endpoint A, and the user begins to hear ringback from the trunk.
  g) When the trunk call arrives at the TG 132 in the other branch, the TG 132 notifies SM 120 about the incoming trunk call, which in turn notifies the IGAR application 124.
  h) The IGAR application 124 uses the incoming caller ID to match the outgoing trunk to the incoming trunk.
  i) The IGAR application 124 rings SIP endpoint B 132, sending it the connectivity information it needs to connect to the incoming trunk when SIP user B answers.
  j) When SIP user B answers, SIP user A is already connected to the trunk and can hear the "hello" greeting from SIP user B.

If the cost index 228 specifies the reverse direction, then the steps starting with (f) change to the following:
  f) The IGAR application 124 directs SIP user A's endpoint to play local ringback.
  g) No change from above
  h) No change from above
  i) The IGAR application 124 rings SIP endpoint B 132, sending it the connectivity information it needs to connect to the outgoing trunk when SIP user B answers.
  j) When SIP user B answers, the IGAR application 124 sends the connectivity information for the incoming trunk to SIP endpoint A 132, and the user can hear the "hello" greeting from SIP user B.

As can be appreciated by one of skill in the art from the present description, systems and methods disclosed herein allow for the ultimate routing of a session initiation protocol call over the PSTN 116 using any terminal gateway 128, including a SIP capable terminal gateway 128, in a communication system 100, including terminal gateways 128 and neighboring or otherwise interconnected branches 108. In addition, the use of unique identifiers passed via trunk signaling allows incoming and outgoing trunks to be paired up by the IGAR application 124. Moreover, this is accomplished without requiring additional out of band signaling or in band DTMF signaling. In addition, the direction of the trunk call can be controlled, allowing a lower cost trunk to be selected as the originating, even where the lower cost trunk is associated with the called endpoint 132 network branch 108.

Although various examples provided herein discuss the use of endpoints 132 comprising SIP endpoints or devices, embodiments of the disclosed invention are not so limited. For instance, embodiments can include any system in which one or both endpoints (e.g., phones) 132 are not SIP endpoints and are connected to a session manager 120 through some gateway 128 or access element that provides conversion between non-SIP protocol from/to the endpoint 132 and SIP to/from the session manager 120. Accordingly, an endpoint 132 can include any endpoint that communicates using SIP either directly or via an intermediary device.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for effecting a communication between communication endpoints in a communication network, comprising:
  initiating a call from a first endpoint to a second endpoint, wherein the first endpoint is included in a first branch of the communication network, and wherein the second endpoint is included in a second branch of the communication network;
  determining by a first communication server that there is insufficient bandwidth on a first network to complete the call between the first and second endpoints;
  initiating by the first communication server an alternate routing, wherein initiating the alternate routing includes sending a request to an inter-gateway alternate routing (IGAR) application;
  assigning by the IGAR application at least first and second terminal gateways for the call, wherein the first terminal gateway is associated with the first branch and the second terminal gateway is associated with the second branch;

initiating by the IGAR application a trunk call from the first branch using a unique identifier associated with the first endpoint to identify a user in the first branch and a unique direct dial number assigned to the second branch, wherein the unique identifier associated with the first endpoint is communicated via the first gateway of the first branch to the second gateway of the second branch when the trunk call is initiated; and applying, by the IGAR application, the unique identifier to match the first trunk to the second trunk.

2. The method of claim 1, further comprising:
after initiating the trunk call, the IGAR application sending connectivity information for a first trunk associated with the first branch to the first endpoint, wherein the first trunk is an outgoing trunk.

3. The method of claim 2, further comprising:
after sending the connectivity information for the first trunk to the first endpoint, providing the calling party with a ringback signal;
receiving the trunk call at the second terminal gateway;
notifying the first communication server about the trunk call; and
notifying the IGAR application by the first communication server about the trunk call.

4. The method of claim 3, further comprising:
ringing by the IGAR application the second endpoint and providing by the IGAR application the second endpoint connectivity information to connect to the second trunk, wherein the connectivity information includes the unique identifier.

5. The method of claim 4, further comprising:
answering at the second endpoint by a called user; and
connecting the second endpoint to the second trunk, wherein the first and second endpoints are placed in communication with one another.

6. The method of claim 1, wherein the inter-gateway alternate routing application assigns the first and second terminal gateways based on where the first and second terminal gateways are relative to the first and second endpoints respectively.

7. The method of claim 1, wherein the inter-gateway alternate routing application assigns the first and second terminal gateways based on a cost index assigned to the first and second terminal gateways.

8. The method of claim 1, wherein at least one of the first and second terminal gateways is associated with at least one of a TDM trunk or a connection over an alternate data network.

9. The method of claim 1, wherein at least one of the first and second terminal gateways is at least one of:
in the same branch as each of the first and second endpoints, and
in a neighboring branch of at least one of the first and second endpoints.

10. A communication server, comprising:
memory;
a processor;
a session manager application; and
an inter-gateway alternate route (IGAR) application stored on the memory and executed by the processor, wherein in response to a determination by the session manager application that a call admission control limit has been exceeded, the IGAR application is invoked, wherein the IGAR application operates to select a first trunk line in a first branch and second trunk line in a second branch for routing a call over the PSTN, wherein the IGAR application causes a trunk call to be initiated from the first trunk line in the first branch to the second trunk line in the second branch based on the call being initiated from a first endpoint in the first branch wherein the IGAR application sends information identifying the selected first and second trunk lines to associated endpoints to complete the call as part of an invite message, and wherein the IGAR application applies the unique identifier to match the first trunk line to the second trunk line.

11. The communication server of claim 10, wherein the communication server is implemented as a plurality of interconnected devices.

12. The communication server of claim 10, wherein the communication server is interconnected to an IP network, and wherein the first and second trunk lines are associated with an alternate data network.

13. An enterprise network, comprising:
a communication server, including:
memory;
a processor;
a session manager application stored in the memory and executable by the processor;
an inter-gateway alternate route application;
an Internet Protocol communication network;
a public switched telephony network;
a first network branch, including:
a plurality of session initiation protocol (SIP) endpoints;
a terminal gateway;
a second network branch; including:
a plurality of session SIP endpoints; and
a terminal gateway, wherein in response to an initiation of a call from a first SIP endpoint included in the first network branch to a second SIP endpoint included in the second network branch, where the communication network is determined to be unable to handle the call,
the IGAR application is executed by the processor of the communication server to select at least a first trunk in a first branch and a second trunk in a second branch for establishing a call path over the PSTN, wherein the IGAR application causes a trunk call to be initiated from the first trunk in the first branch to the second trunk in the second branch based on the call being initiated from a first endpoint in the first branch, and provides information identifying the first trunk to the first communication device and information identifying the second trunk to the second SIP endpoint in a SIP invite message, wherein the first and second SIP endpoints apply the information to complete the call, and wherein the IGAR application applies the unique identifier to match the first trunk to the second trunk.

14. The network of claim 13, wherein the first trunk is an incoming trunk and the second trunk is an outgoing trunk.

15. The network of claim 13, wherein the communication server includes multiple server devices, wherein a session manager is implemented by a first one of the multiple server devices, and wherein the IGAR application is executed by a second one of the multiple server devices.

* * * * *